(12) United States Patent
Chen

(10) Patent No.: US 12,083,665 B2
(45) Date of Patent: Sep. 10, 2024

(54) TOOL HOLDER MODULE

(71) Applicant: SHIN-YAIN INDUSTRIAL CO., LTD., Taichung (TW)

(72) Inventor: Pen Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 141 days.

(21) Appl. No.: 18/149,958

(22) Filed: Jan. 4, 2023

(65) Prior Publication Data
US 2024/0217086 A1    Jul. 4, 2024

(51) Int. Cl.
*B25H 3/00*    (2006.01)
*B23B 31/00*   (2006.01)
*B25H 3/04*    (2006.01)

(52) U.S. Cl.
CPC .......... *B25H 3/003* (2013.01); *B23B 31/005* (2013.01); *B25H 3/04* (2013.01)

(58) Field of Classification Search
CPC ........ B25H 3/003; B25H 3/04; B23B 31/005; B23Q 3/15536
See application file for complete search history.

(56) References Cited

U.S. PATENT DOCUMENTS

| | | | | |
|---|---|---|---|---|
| 3,431,635 A * | 3/1969 | Balding | ................ | B23B 31/006 483/66 |
| 3,526,033 A * | 9/1970 | Saunders | ........... | B23Q 3/15706 483/54 |
| 3,568,849 A * | 3/1971 | Hutchison | .......... | B23Q 3/15536 483/59 |
| 3,604,565 A * | 9/1971 | Freeman | ............ | B23Q 3/15536 248/314 |
| 3,818,580 A * | 6/1974 | Pagella | .............. | B23Q 3/15526 483/66 |
| 3,822,790 A * | 7/1974 | Armour | ................... | F16B 9/056 279/23.1 |
| 3,911,540 A * | 10/1975 | Johnson | ............. | B23Q 3/15506 483/2 |
| 4,155,460 A * | 5/1979 | Ratti | ...................... | B25H 3/003 211/70.6 |

(Continued)

FOREIGN PATENT DOCUMENTS

| | | | | |
|---|---|---|---|---|
| DE | 202009000804 U1 * | 4/2010 | ........... | B23Q 1/0018 |
| DE | 202014106028 U1 * | 4/2016 | ............. | B23Q 3/157 |

(Continued)

*Primary Examiner* — Stanton L Krycinski
(74) *Attorney, Agent, or Firm* — Rosenberg, Klein & Lee

(57) ABSTRACT

A tool holder module has a tool holder and a tool holder assembly jig. The tool holder assembly jig has a horizontal supporting seat. A flange recess is formed in the top surface of the horizontal supporting seat and is configured to accommodate a flange of the tool holder. The flange recess has two clamping portions, and each clamping portion protrudes from a respective one of two opposite surfaces of the flange recess and extends linearly from an opening of the flange recess toward a bottom of the flange recess. The two clamping portions are configured to engage with the two clamping recesses to prevent the tool holder from rotating relative to the horizontal supporting seat. The tool holder is selectively mounted on one of the vertical supporting seat and the horizontal supporting seat.

6 Claims, 10 Drawing Sheets

(56) References Cited

U.S. PATENT DOCUMENTS

| | | | | |
|---|---|---|---|---|
| 4,359,163 | A * | 11/1982 | Ratti | B23Q 3/15553 211/70.6 |
| 4,499,650 | A * | 2/1985 | Cannon | B23Q 3/15526 483/54 |
| 4,520,550 | A * | 6/1985 | Dunn | B25J 15/0491 901/41 |
| 4,535,897 | A * | 8/1985 | Remington | B25H 3/00 211/74 |
| 4,941,577 | A * | 7/1990 | Ferree | B23Q 3/15536 211/70.6 |
| 5,107,581 | A * | 4/1992 | Reuter | B23Q 3/15536 483/62 |
| 6,142,920 | A * | 11/2000 | Ogura | B23Q 3/15536 483/65 |
| 6,641,511 | B2 * | 11/2003 | Patel | B23Q 3/157 483/54 |
| 7,445,129 | B2 * | 11/2008 | Lin | F16M 13/02 211/60.1 |
| 7,506,770 | B2 * | 3/2009 | Rief | E04H 4/14 211/70.6 |
| 7,753,216 | B2 * | 7/2010 | Kao | B25H 3/04 211/70.6 |
| 9,102,041 | B2 * | 8/2015 | Chen | B25B 13/56 |
| 9,694,491 | B1 * | 7/2017 | Kao | B25H 3/003 |
| 9,914,207 | B2 * | 3/2018 | Kao | B25H 3/04 |
| 9,956,681 | B2 * | 5/2018 | Kao | B25H 3/04 |
| 10,710,233 | B2 * | 7/2020 | Zoller | F16B 2/22 |
| 11,440,150 | B1 * | 9/2022 | Chen | B23Q 3/15536 |
| 2003/0130101 | A1 * | 7/2003 | Hwang | B23Q 3/15722 211/1.53 |
| 2006/0060546 | A1 * | 3/2006 | Lin | F16M 13/02 211/60.1 |
| 2008/0000854 | A1 * | 1/2008 | Rief | E04H 4/1654 211/70.6 |
| 2013/0040792 | A1 * | 2/2013 | Arana | B23Q 3/15706 483/902 |

FOREIGN PATENT DOCUMENTS

| | | | |
|---|---|---|---|
| EP | 0522498 A1 | * | 1/1993 |
| JP | 3233841 U | * | 9/2021 |
| KR | 101014623 B1 | * | 2/2011 |

* cited by examiner

TOOL HOLDER MODULE

BACKGROUND OF THE INVENTION

1. Field of the Invention

The present invention relates to a device configured for replacing cutting tools of machine tools, especially to a tool holder module with a tool holder assembly jig that is configured to hold the cutting tools steadily.

2. Description of the Prior Arts

A tool holder assembly jig is a device configured for assisting the replacement of cutting tools in front of a tool holder. Conventional tool holders can be classified into two types: vertical tool holder assembly jigs and horizontal tool holder assembly jigs. To use the vertical tool holder assembly jig, the tool holder is disposed vertically in the vertical tool holder assembly jig. On the other hand, to use the horizontal tool holder assembly jig, the tool holder is disposed horizontally in the horizontal tool holder assembly jig.

After disposing the tool holder in the tool holder assembly jig, manually loosen a nut on a front end of the tool holder with a hook spanner or similar tools to remove a cutting tool originally connected to the tool holder, and then insert a new cutting tool into the tool holder and tighten the nut to complete the replacement of the cutting tools.

The conventional horizontal tool holder assembly jig mainly includes a support seat which has a semicircular cavity recessed in a top of the support seat and configured to accommodate a horizontally disposed tool holder. A positioning member is mounted in a bottom surface of the semicircular cavity and protrudes from the bottom surface. The positioning member engages with a positioning recess in a periphery of the tool holder to prevent relative rotation between the tool holder and the support seat when manually tightening or loosening the nut on the tool holder.

However, engaging the tool holder only with one positioning member does not provide enough fixation for the tool holder, and therefore the tool holder wobbles easily during tightening or loosening of the nut. As a result, the conventional horizontal tool holder assembly jig has to be used with care to prevent wobbling of the cutting tool, making the conventional horizontal tool holder assembly jig inconvenient to use.

To overcome the shortcomings, the present invention provides a tool holder module to mitigate or obviate the aforementioned problems.

SUMMARY OF THE INVENTION

The main objective of the present invention is to provide a tool holder module that prevents wobble of the tool holder during nut-tightening or nut-loosening.

The tool holder module has a tool holder and a tool holder assembly jig. The tool holder has a shank and a flange arranged along an axial direction of the tool holder. The shank is a non-cylindrical rod, and the flange has at least one clamping recess set. Each of the at least one clamping recess set includes two clamping recesses. The two clamping recesses are formed in an outer peripheral surface of the flange and are disposed oppositely along a radial direction of the tool holder. The tool holder assembly jig has a base, a vertical supporting seat, and a horizontal supporting seat. The vertical supporting seat is mounted on the base and has a shaft retaining hole. The shaft retaining hole extends upward and downward through the vertical supporting seat. The shaft retaining hole is configured to be mounted through by the shank of the tool holder. The shaft retaining hole is non-cylindrical and corresponds in shape to the shank of the tool holder to prevent the tool holder from rotating relative to the vertical supporting seat. The horizontal supporting seat is mounted on the base and has a shank recess and a flange recess. The shank recess is formed in a top surface of the horizontal supporting seat and is configured to accommodate the shank of the tool holder. The flange recess is formed in the top surface of the horizontal supporting seat and is configured to accommodate the flange of the tool holder. The flange recess has two clamping portions formed in the flange recess. Each of the two clamping portions protrudes from a respective one of two opposite surfaces of the flange recess and extends linearly from an opening of the flange recess toward a bottom of the flange recess. Each of the two clamping portions is configured to engage with a respective one of the two clamping recesses of one of the at least one clamping recess set to prevent the tool holder from rotating relative to the horizontal supporting seat. The tool holder is selectively mounted on one of the vertical supporting seat and the horizontal supporting seat.

The advantage of the present invention is that when the tool holder is mounted on the horizontal supporting seat, the flange and the shank of the tool holder are located in the flange recess and shank recess of the horizontal supporting seat respectively, wherein the flange of the tool holder is clamped from opposite directions by the elongated clamping portions to provide better fixation such that the tool holder does not wobble even if a user rotates a nut of the tool holder with a lot of force.

When the tool holder is mounted on the vertical supporting seat, the non-circular shaft retaining hole, which corresponds in shape to the shank of the tool holder, prevents the tool holder from rotating, thereby ensuring that the tool holder is securely fixed in a vertical position on the vertical supporting seat for ease of replacing cutting tools.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 4 and FIGS. 7 and 8, a tool holder module in accordance with the present invention comprises a tool holder 10 and a tool holder assembly jig 20.

Figure 7:
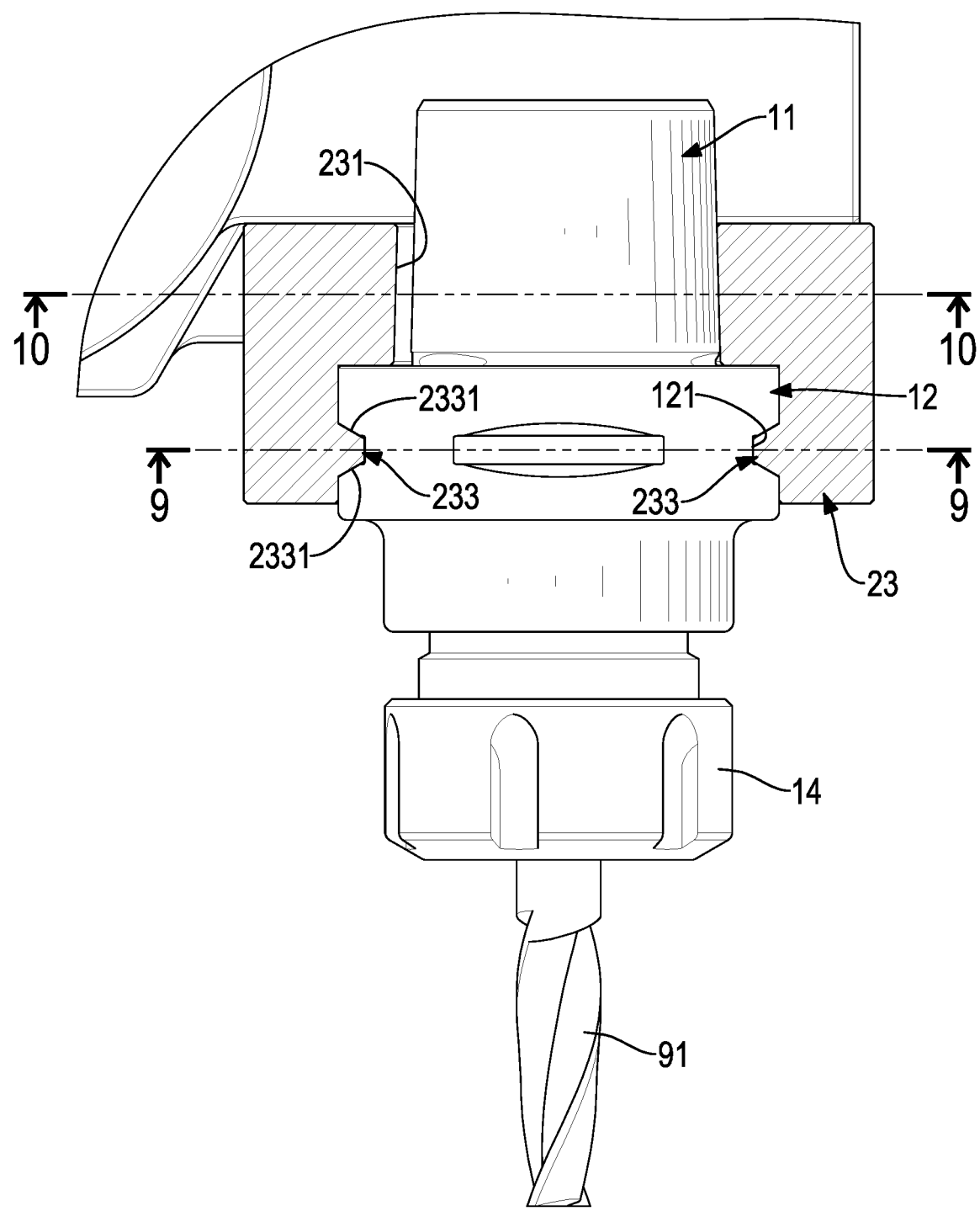
FIG. 7 is a schematic sectional view of the tool holder module taken across line 7-7 in FIG. 6.
Figure 8:
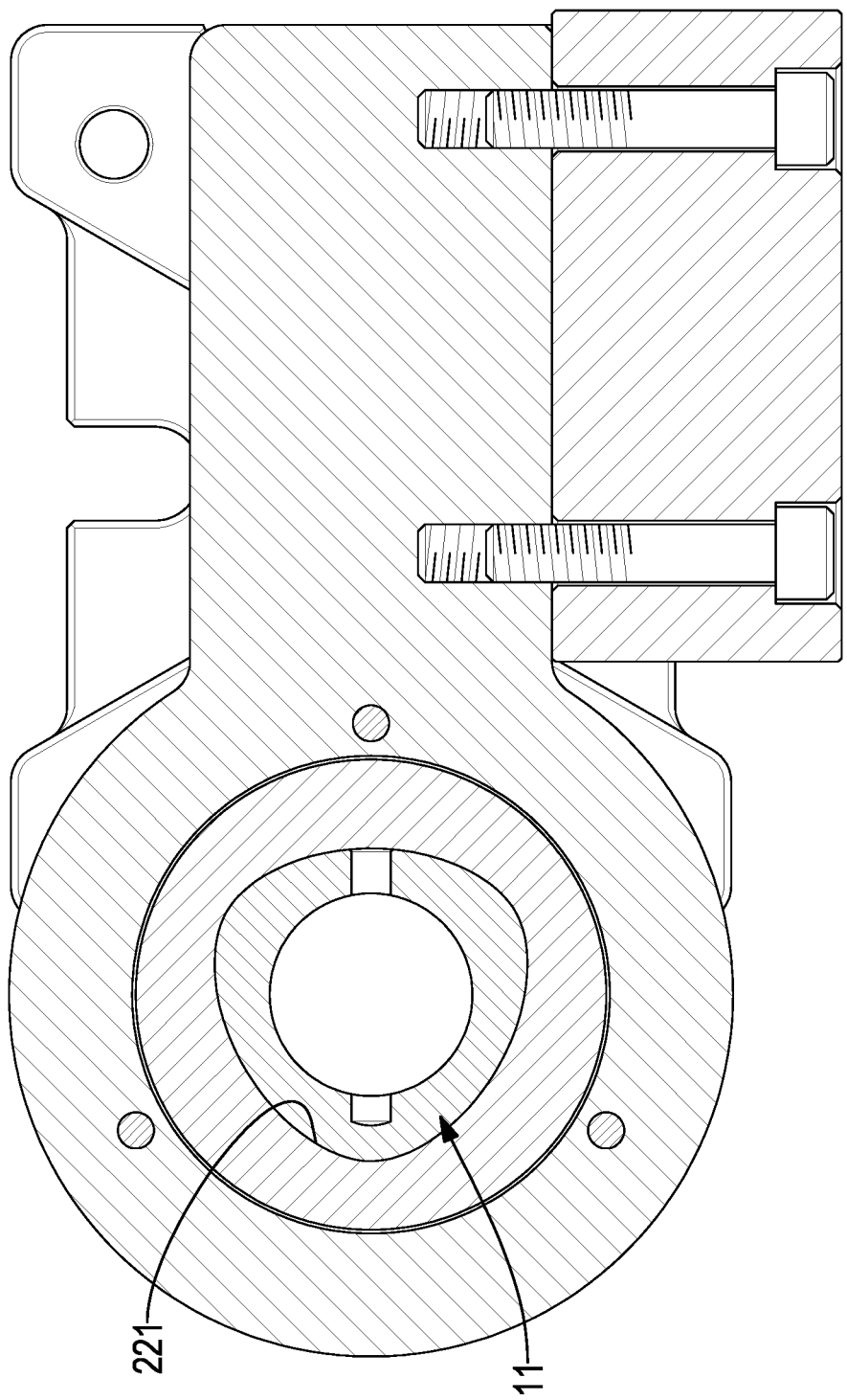
FIG. 8 is a schematic sectional view of the tool holder module taken across line 8-8 in FIG. 6.
Figure 9:
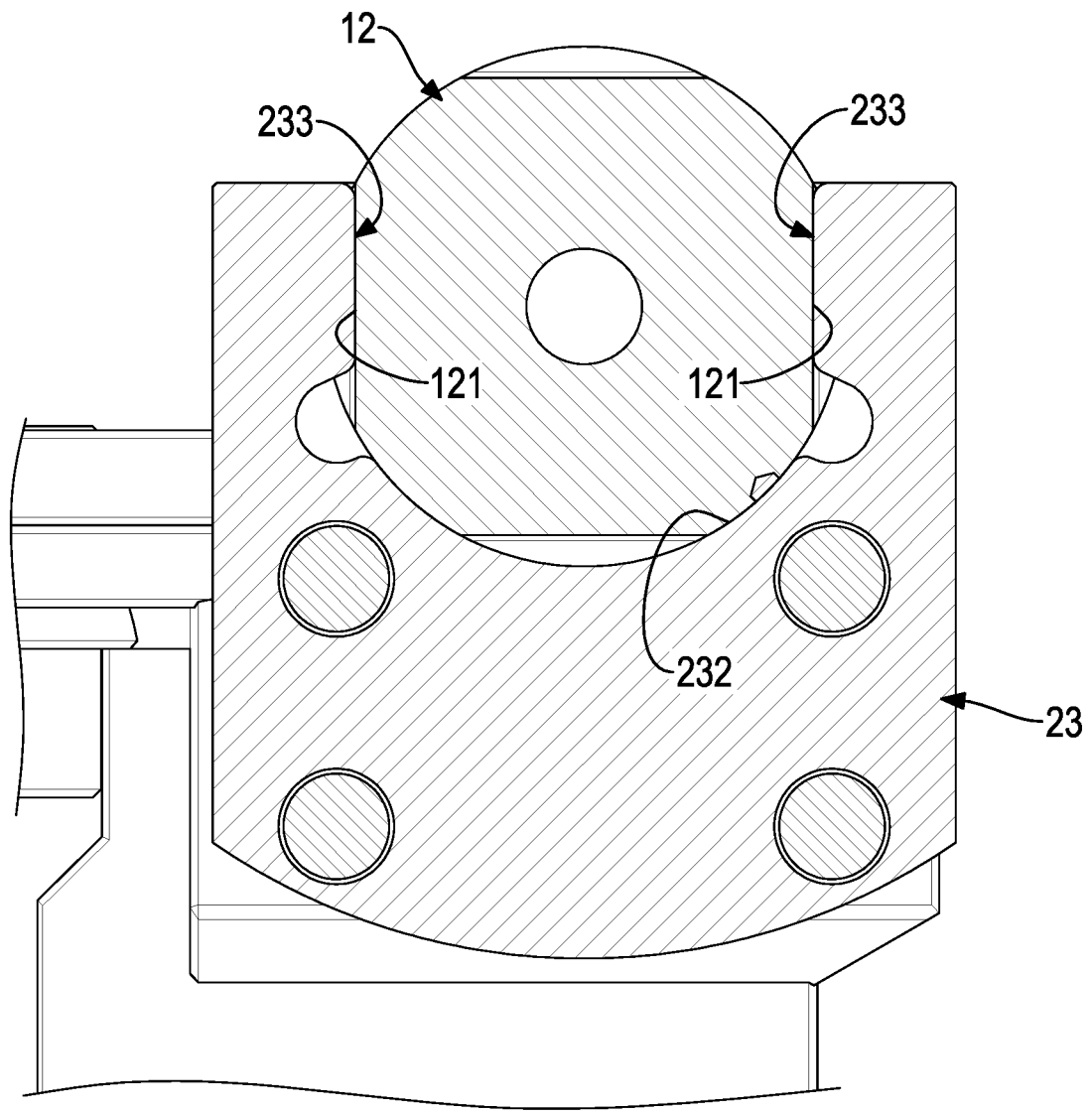
FIG. 9 is a schematic sectional view of the tool holder module taken across line 9-9 in FIG. 7.
Figure 10:
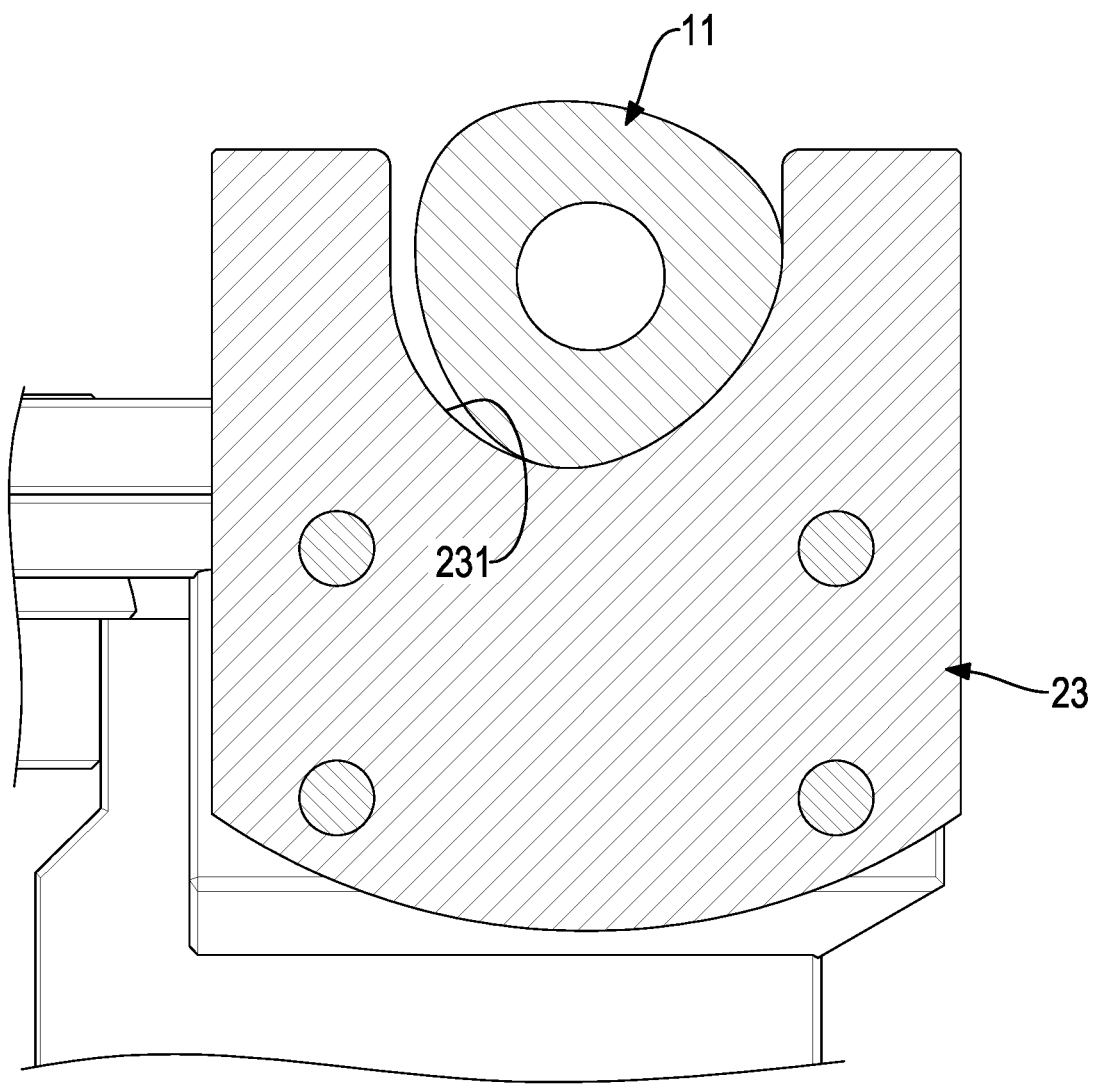
FIG. 10 is a schematic sectional view of the tool holder module taken across line 10-10 in FIG. 7.

The tool holder 10 has a main body, a collet 13 and a nut 14. A shank 11 and a flange 12 are formed on the main body, and the shank 11, the flange 12, and the collet 13 are arranged along an axial direction of the tool holder 10. The shank 11 is a non-cylindrical rod, and to be more precise, the shape of the shank 11 is polygonal taper and in compliance with ISO26623-1; that is, a cross section of the shank 11 is substantially triangular (as shown in FIG. 8), and a width of the shank 11 gradually decreases toward the axial direction of the tool holder 10 (as shown in FIG. 7).

At least one clamping recess set is formed on the flange 12, and each clamping recess set includes two clamping recesses 121. The two clamping recesses 121 are formed in an outer peripheral surface of the flange 12 and disposed oppositely along the radial direction of the tool holder 10.

In the preferred embodiment, the at least one clamping recess set includes two clamping recesses, and therefore there are totally four clamping recesses 121 formed in the outer peripheral surface of the flange 12. The four clamping recess 121 are annularly disposed apart from each other at equal intervals. Two of the clamping recesses 121 disposed oppositely belong to the same clamping recess set. A bottom of each of the clamping recesses 121 is an elongated flat surface.

The collet 13 and the nut 14 are conventional standard components. The collet 13 is configured to clamp a cutting tool 91, and the nut 14 is located around the collet 13 and screwed to the main body. When the nut 14 is not tightened, the cutting tool 91 can be easily inserted into or removed from the collet 13. When the nut 14 is tightened, the collet 13 is compressed by an inner surface of the nut 14 such that the cutting tool 91 is firmly clamped by the collet 13.

The tool holder assembly jig 20 has a base 21, a vertical supporting seat 22, and a horizontal supporting seat 23. The base 21 is preferably fixed on a work bench or a device by a vice or a platen. The vertical supporting seat 22 is mounted on the base 21 and has a shaft retaining hole 221 extending upward and downward through the vertical supporting seat 22. The shaft retaining hole 221 is configured to be mounted through by the shank 11 of the tool holder 10. The shaft retaining hole 221 is non-cylindrical and corresponds in shape to the shank 11 of the tool holder 10 to prevent the tool holder 10 from rotating relative to the vertical supporting seat 22.

Figure 1:
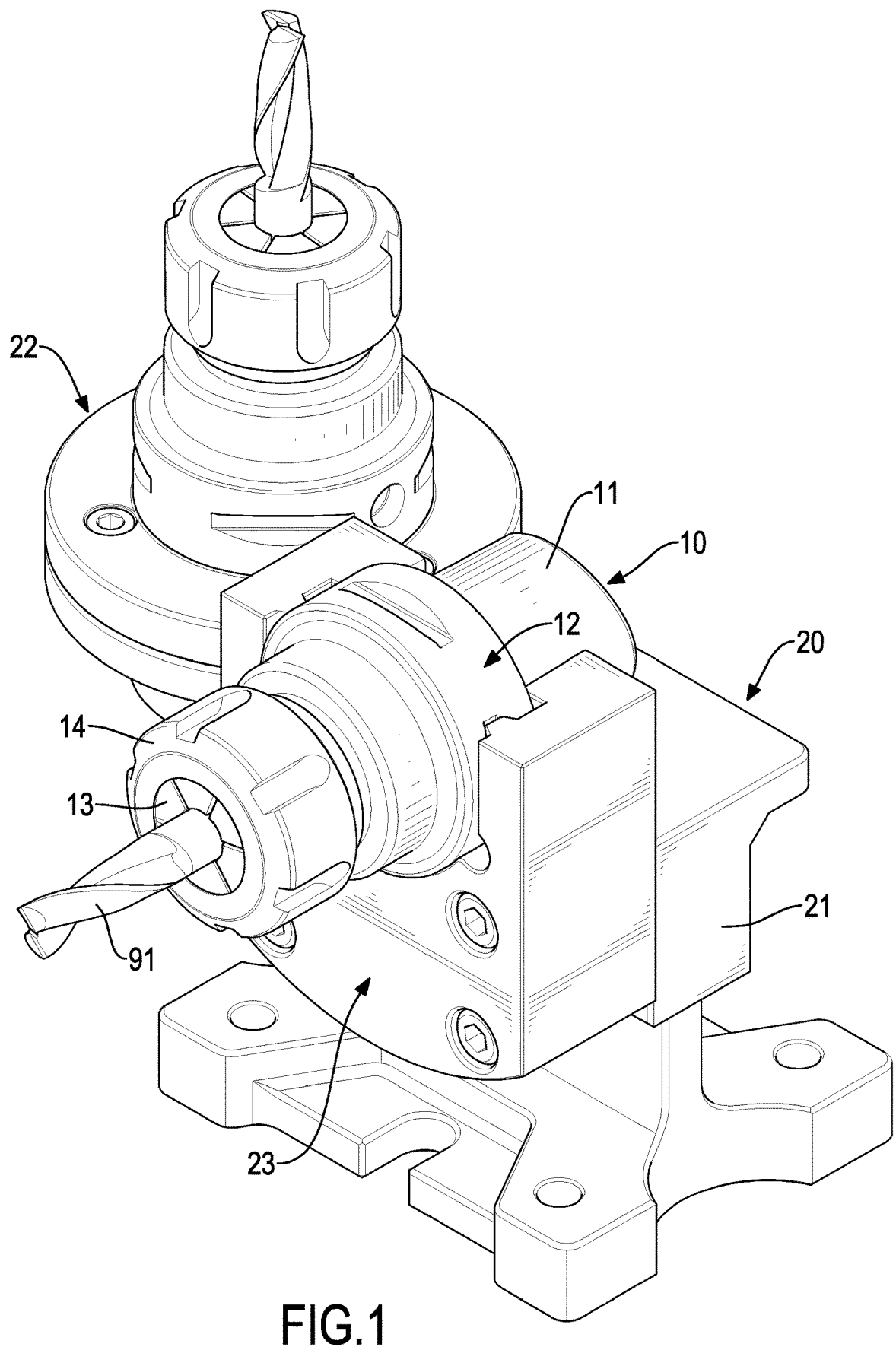
FIG. 1 is a schematic perspective view of a tool holder module in accordance with the present invention.
Figure 2:
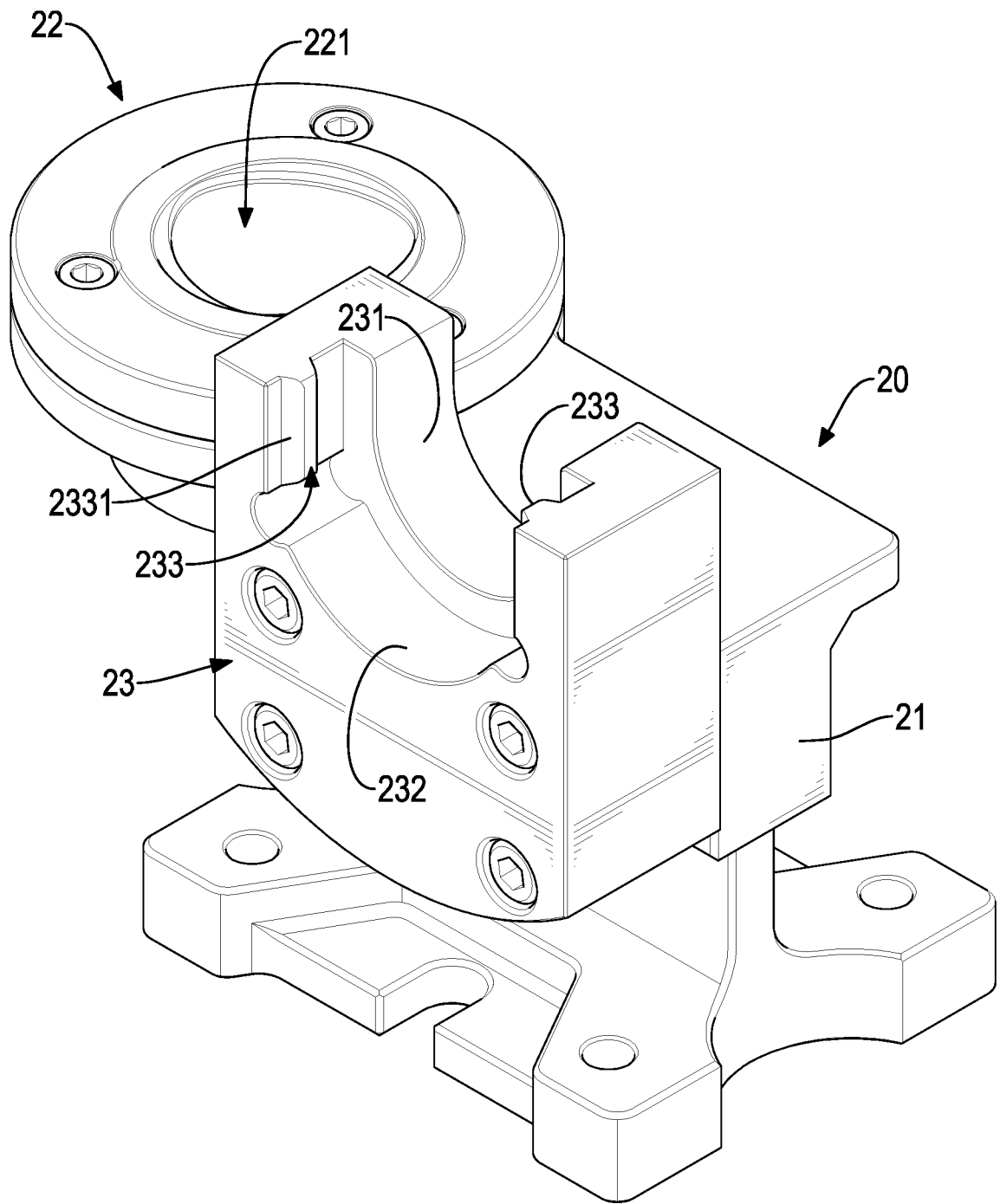
FIG. 2 is a perspective view of a tool holder assembly jig of the tool holder module in FIG. 1.
Figure 3:
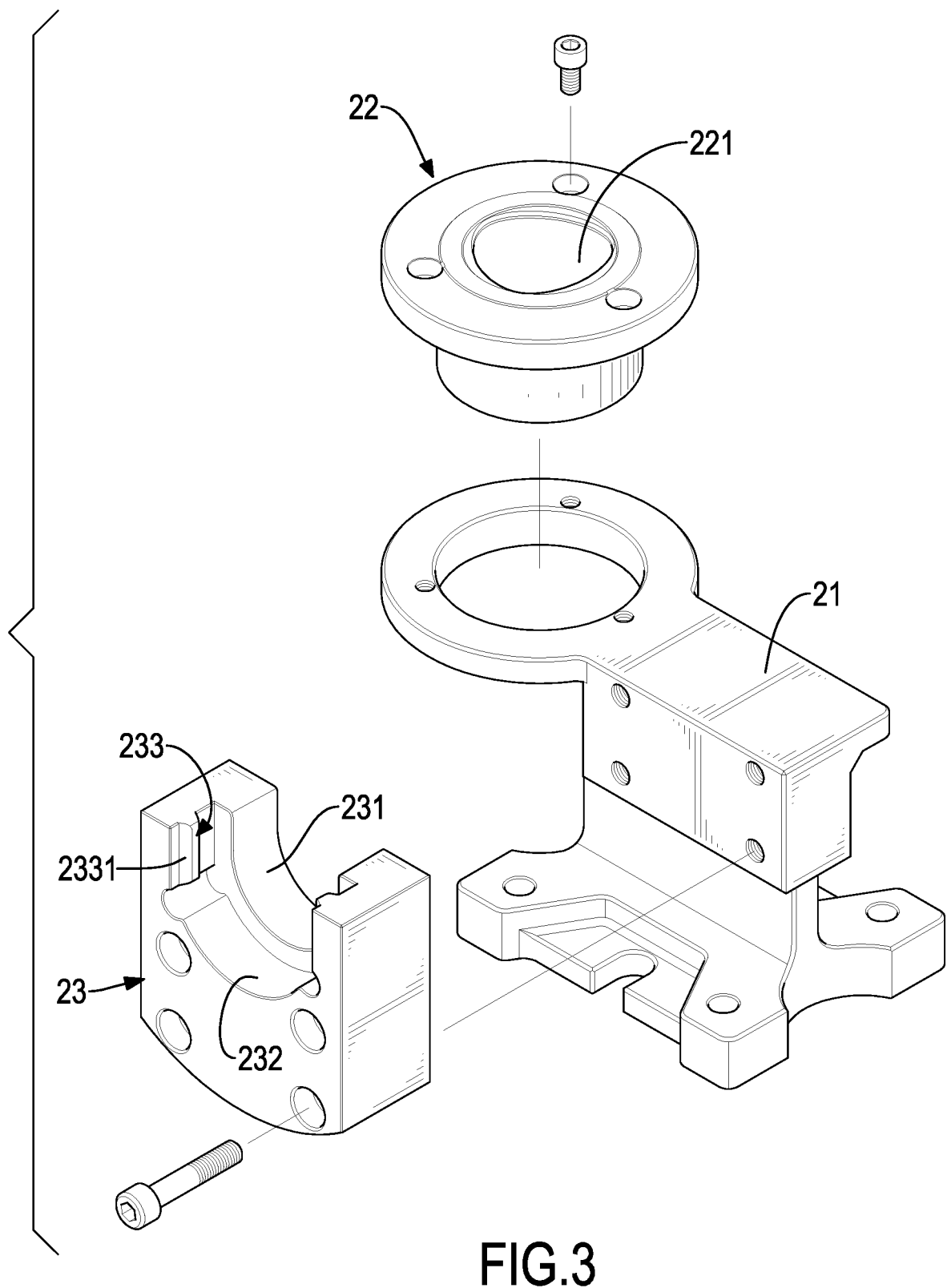
FIG. 3 is an exploded perspective view of the tool holder assembly jig of the tool holder module in FIG. 1.
Figure 4:
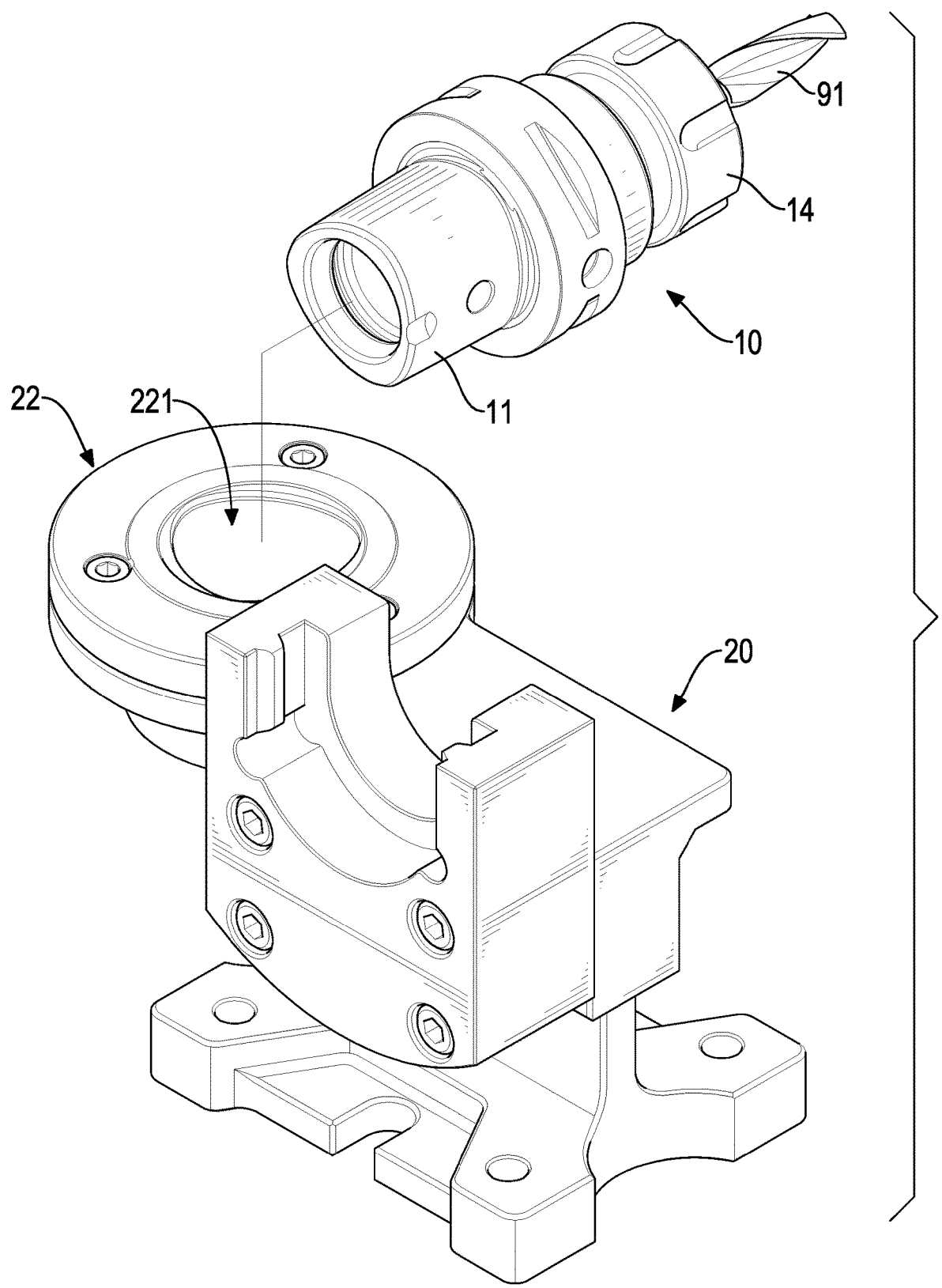
FIG. 4 is a schematic view of a tool holder being mounted in a vertical supporting seat of the tool holder assembly jig of the tool holder module in FIG. 1.
Figure 5:
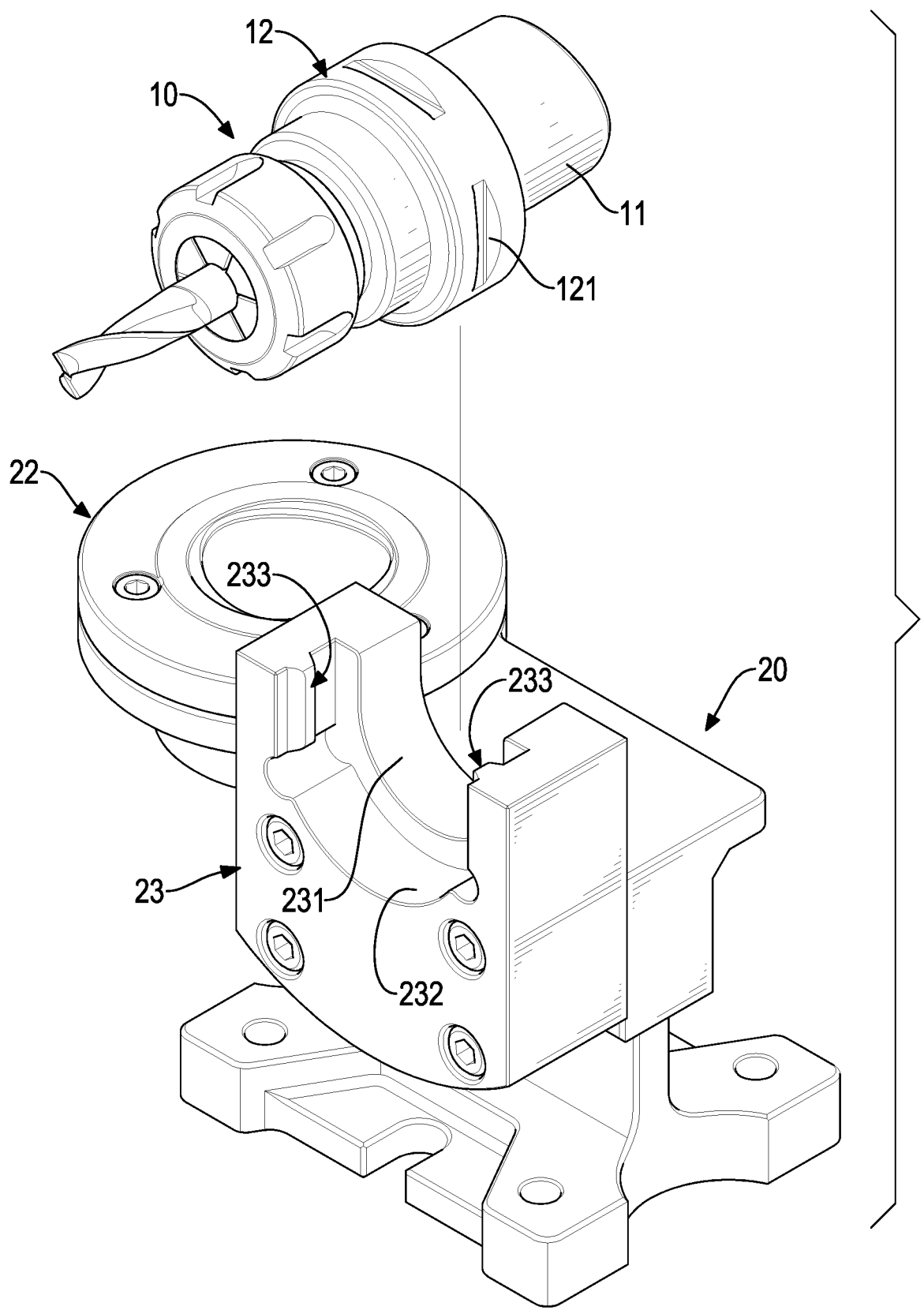
FIG. 5 is a schematic view of the tool holder being mounted in a horizontal supporting seat of the tool holder assembly jig of the tool holder module in FIG. 1.
Figure 6:
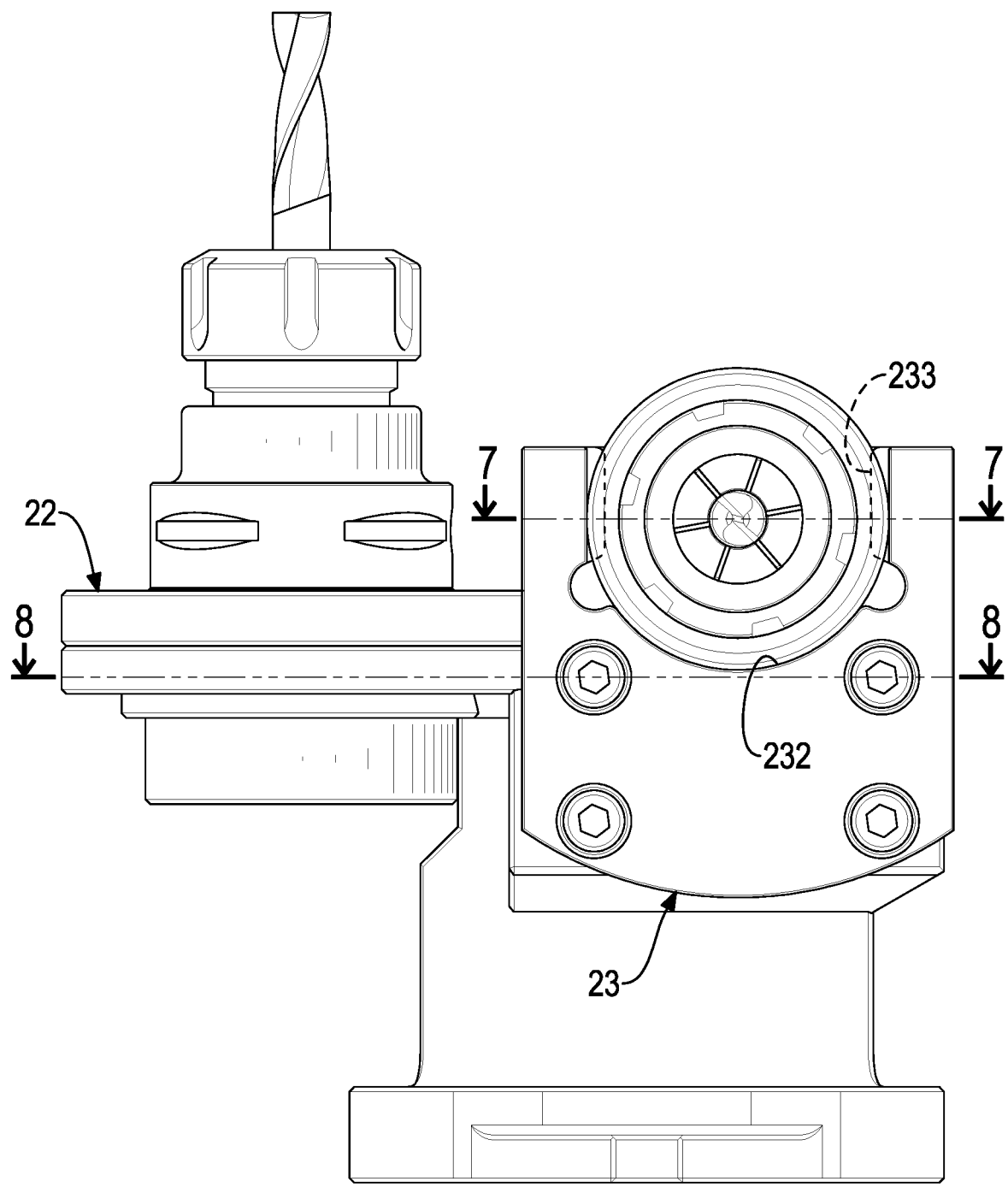
FIG. 6 is a front view of the tool holder module in FIG. 1.

With reference to FIGS. 4 and 8, the shaft retaining hole 221 corresponds in shape to the shank 11, which means that the shaft retaining hole 221 and the shank 11 are both polygonal taper in shape (as shown in FIG. 8) such that when the shank 11 is mounted through the shaft retaining hole 221, a surface defining the shaft retaining hole 221 is attached to the outer periphery surface of the shank 11 to prevent the shank 11 from rotating. The shape of the shaft retaining hole 221 is not limited to abovementioned as long as the shaft retaining hole 221 is non-circular and is capable of preventing the shank 11 from rotating relative to the vertical supporting seat 22.

With reference to FIGS. 5 to 7 and FIG. 10, the horizontal supporting seat 23 is mounted on the base 21; a shank recess 231 and a flange recess 232 are formed on a top surface of the horizontal supporting seat 23. The shank recess 231 is configured to accommodate the shank 11 of the tool holder 10. In the preferred embodiment, a width of the shank recess 231 gradually reduces along a direction away from the flange recess 232 to be compatible with a taper angle of the shank 11, and a bottom of the shank recess 231 is in contact with the shank 11 to make the tool holder 10 securely mounted to the horizontal supporting seat 23.

With reference to FIGS. 5 to 7 and FIG. 9, the flange recess 232 is configured to accommodate the flange 12 of the tool holder 10. The flange recess 232 has two clamping portions 233 formed in the flange recess 232.

Each of the two clamping portions 233 protrudes from a respective one of two opposite surfaces of the flange recess 232 and extends linearly from an opening of the flange recess 232 toward a bottom of the flange recess 232. Each clamping portion 233 is configured to engage with a respective one of the two clamping recesses 121 of one of the two clamping recess set to prevent the tool holder from rotating relative to the horizontal supporting seat 23, and also ensures that the tool holder 10 does not wobble.

Each of the clamping portions 233 preferably extends in a vertical direction, but not limited thereto. In another preferred embodiment, a direction toward which each clamping portion 233 extends can be inclined relative to the vertical direction.

In the preferred embodiment, each of the two clamping portions 233 of the horizontal supporting seat 23 has two inclined planes 2331 which are disposed oppositely. The two inclined planes 2331 incline toward each other such that a width of the clamping portion 233 gradually reduces from a bottom of the clamping portion 233 toward a top of the clamping portion 233. To be more precise, the two inclined planes 2331 incline toward each other such that a cross section of the clamping portion 233 is trapezoidal. Each of the two inclined planes 2331 of the same clamping portion 233 is configured to attach a corresponding one of two opposite surfaces of the respective clamping recess 121 to further ensure that the tool holder 10 does not wobble.

When in use, the tool holder 10 can be mounted on the vertical supporting seat 22 or the horizontal supporting seat 23 depending on the application; that is, the tool holder assembly jig 20 is a vertical-horizontal tool holder assembly jig.

When the tool holder 10 is mounted on the vertical supporting seat 22, the shank 11 of the tool holder 10 is mounted through the shaft retaining hole 221 of the vertical supporting seat 22. When the tool holder 10 is mounted on the horizontal supporting seat 23, the shank 11 and the flange 12 of the tool holder 10 are located in the shank recess 231 and the flange recess 232 of the horizontal supporting seat 23 respectively, and the two clamping recesses 121 of the tool holder 10 are engaged by the two clamping portions 233 of the tool holder assembly jig 20 to ensure that the tool holder 10 does not wobble during loosening or tightening of the nut 14.

In summary, when the tool holder 10 is mounted on the horizontal supporting seat 23, the flange 12 and shank 11 of the tool holder 10 are located in the flange recess 232 and the shank recess 231 of the horizontal supporting seat 23 respectively, wherein the flange 12 of the tool holder 10 is clamped from opposite directions by the elongated clamping portions 233 to provide better fixation such that the tool holder 10 does not wobble even if a user rotates a nut of the tool holder 10 with a lot of force.

When the tool holder 10 is mounted on the vertical supporting seat 22, the non-circular shaft retaining hole 221, which corresponds in shape to the shank 11 of the tool holder 10, prevents the tool holder 10 from rotating, thereby ensuring that the tool holder 10 is securely fixed in a vertical position on the vertical supporting seat 22 for ease of replacing cutting tools 91.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tool holder module comprising:
   a tool holder having a shank and a flange arranged along an axial direction of the tool holder; the shank being a non-cylindrical rod; the flange having at least one clamping recess set; each of the at least one clamping recess set including two clamping recesses; the two clamping recesses formed in an outer peripheral surface of the flange and disposed oppositely along a radial direction of the tool holder; and
   a tool holder assembly jig having:
      a base;
      a vertical supporting seat mounted on the base and having a shaft retaining hole; the shaft retaining hole extending upward and downward through the vertical supporting seat, configured to be mounted through by the shank of the tool holder, being non-cylindrical, and corresponding in shape to the shank of the tool holder to prevent the tool holder from rotating relative to the vertical supporting seat; and
      a horizontal supporting seat mounted on the base and having:
         a shank recess formed in a top surface of the horizontal supporting seat and configured to accommodate the shank of the tool holder;
         a flange recess formed in the top surface of the horizontal supporting seat and configured to accommodate the flange of the tool holder; the flange recess having two clamping portions formed in the flange recess; each of the two clamping portions protruding from a respective one of two opposite surfaces of the flange recess and extending linearly from an opening of the flange recess toward a bottom of the flange recess; each of the two clamping portions configured to engage with a respective one of the two clamping recesses of one of the at least one clamping recess set to prevent the tool holder from rotating relative to the horizontal supporting seat;
      wherein the tool holder is selectively mounted on one of the vertical supporting seat and the horizontal supporting seat.

2. The tool holder module as claimed in claim 1, wherein each of the two clamping portions of the horizontal supporting seat has two inclined planes which are disposed oppositely; the two inclined planes incline toward each other such that a width of the clamping portion gradually reduces from a bottom of the clamping portion toward a top of the clamping portion; each of the two inclined planes is configured to attach a corresponding one of two opposite surfaces of the respective clamping recess.

3. The tool holder module as claimed in claim 1, wherein each of the two clamping portions of the horizontal supporting seat extends in a vertical direction.

4. The tool holder module as claimed in claim 2, wherein each of the two clamping portions of the horizontal supporting seat extends in a vertical direction.

5. The tool holder module as claimed in claim 1, wherein the tool holder is a polygonal taper tool holder.

6. The tool holder module as claimed in claim 4, wherein the tool holder is a polygonal taper tool holder.

* * * * *